United States Patent
Achanta et al.

(10) Patent No.: US 6,627,597 B1
(45) Date of Patent: Sep. 30, 2003

(54) METHOD FOR MAKING A NANOPOROUS GRANULAR MATERIAL AND A DETERGENT COMPOSITION

(75) Inventors: Srinivas Achanta, Cincinnati, OH (US); Paul Amaat France, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/807,369

(22) PCT Filed: Oct. 6, 1999

(86) PCT No.: PCT/US99/23297

§ 371 (c)(1),
(2), (4) Date: Apr. 12, 2001

(87) PCT Pub. No.: WO00/22083

PCT Pub. Date: Apr. 20, 2000

Related U.S. Application Data

(60) Provisional application No. 60/104,344, filed on Oct. 15, 1998.

(51) Int. Cl.[7] .................... C11D 11/00; C11D 17/06; F26B 5/06
(52) U.S. Cl. .............. 510/456; 510/276; 510/438; 34/284; 34/287; 34/288
(58) Field of Search ................ 510/456, 276, 510/438; 34/284, 287, 288

(56) References Cited

U.S. PATENT DOCUMENTS

| 3,721,725 A | | 3/1973 | Briggs et al. ............... 264/6 |
| 3,916,532 A | * | 11/1975 | Jaeger et al. ............... 34/284 |
| 3,928,566 A | | 12/1975 | Briggs et al. ............... 424/94 |
| 3,932,943 A | * | 1/1976 | Briggs et al. ............... 34/287 |
| 3,939,260 A | * | 2/1976 | Lafon ............... 424/28 |
| 4,412,947 A | | 11/1983 | Cioca ............... 260/123.7 |
| 4,608,764 A | | 9/1986 | Leuenberger ............... 34/5 |
| 4,919,852 A | | 4/1990 | Green ............... 264/6 |
| 5,019,400 A | * | 5/1991 | Gombotz et al. ............ 424/497 |
| 5,362,761 A | | 11/1994 | Uragami et al. ............... 521/64 |
| 5,607,666 A | * | 3/1997 | Masson et al. ............... 424/69 |
| 5,611,973 A | | 3/1997 | Gurfein et al. ............... 264/5 |
| 5,629,191 A | | 5/1997 | Cahn ............... 435/395 |

FOREIGN PATENT DOCUMENTS

| DE | 4405213 A1 | 8/1985 |
| DE | 38 35 728 A1 | 4/1990 |
| EP | 0 550 086 A1 | 7/1993 |
| EP | 0 636 365 A1 | 2/1995 |
| GB | 1 509 098 | 4/1978 |
| JP | 58056669 | 4/1983 |
| WO | WO 90/13285 | 11/1990 |
| WO | WO 95/22595 | 8/1995 |
| WO | WO 97/48641 | 12/1997 |

* cited by examiner

*Primary Examiner*—Lorna M. Douyon
(74) *Attorney, Agent, or Firm*—Brahm J. Corstanje; Brian M. Bolam; Steven W. Miller

(57) ABSTRACT

A process for producing a starting material in a granular form and in a nanoporous anhydrous state, a process for improving the water-solubility and controlled release characteristics of a detergent material, and a detergent composition are disclosed. In one aspect, a process for producing a starting material in a granular form and in a nanoporous anhydrous state includes obtaining a starting material in a form of a dispersion or solution in a sublimable solvent or mixtures of sublimable solvents, forming graded droplets by atomization, freezing the graded droplets in a freezing medium at a controlled freezing rate of a least 100° C. per second to form frozen droplets and drying the frozen droplets by vacuum sublimation to obtain freeze-dried granules of the starting material in a nanoporous anhydrous state. The starting material in dispersion or solution form has a viscosity suitable for atomization and formation of graded droplets.

16 Claims, No Drawings

METHOD FOR MAKING A NANOPOROUS GRANULAR MATERIAL AND A DETERGENT COMPOSITION

This application claims the benefit of Application No. 60/104,344 filed Oct. 15, 1998.

TECHNICAL FIELD

The present invention relates to nanoporous granular materials, and more particularly, to a process for producing a starting material in a granular form and in a nanoporous anhydrous state, a process for improving the water-solubility and controlled release characteristics of a detergent material, and a detergent composition.

BACKGROUND OF THE INVENTION

Starting materials in the granular form, such as those used for making detergent compositions, have various disadvantages related to the lack of particle size and particle pore size uniformity. One major disadvantage resulting from granular materials having non-uniform pore size, low porosity and non-uniform size distribution is that the solubility of the detergent composition in water is detrimentally affected. Currently, detergent formulators are faced with numerous problems which impede delivering the active ingredients to the fabric or dishware to be cleaned. By way of example, recent low dosage or "compact" detergent products experience dissolution problems, especially in cold temperature laundering solutions (i.e., less than about 30° C.). More specifically, poor dissolution results in the formation of "clumps" which appear as solid white masses remaining in the washing machine or on the laundered clothes after conventional washing cycles. These "clumps" are especially prevalent under cold temperature washing conditions and/or when the order of addition to the washing machine is such that the laundry detergent is added first, the clothes are added thereafter and the water is added in the end, commonly known as the "Reverse Order Of Addition" or "ROOA". Similarly, this clumping phenomenon can contribute to the incomplete dispensing of detergent in washing machines equipped with dispenser drawers or in other dispensing devices, such as a granulettes. In such cases, the undesired result is undissolved detergent residue in the dispensing device.

Another disadvantage is that non-uniform granular materials for detergent applicants do not have a high amount of liquid loading capability, which is necessary, for example, for loading perfume onto a detergent granule. Also it has been recognized by the inventors of this invention that larger pore size and non-uniform pore size distribution in a granular detergent composition leads to lower active agglomerates, i.e., agglomerates that do not have the level of activity desirable for detergent applications.

Another disadvantage of this particle size non-uniformity in powdered starting materials is the presence of sometimes significant amounts of very fine particles which very frequently lead to safety and health problems due to the risk of dusting and pollution by these very fine particles. Consumers of detergent compositions do not want to be exposed to detergent agglomerates that have these undesirable dusting characteristics. Another problem in the detergent area is that the non-uniform size caused the granular starting materials to generally flow with difficulty, which makes it difficult to handle them and in particular, to dose them correctly during usage.

It is very desirable to produce starting materials, such as detergent materials, in the form of granules, that is to say, agglomerates of powder grains having a regular shape, an even surface, a nanoporous sized porosity, and of a generally graded size. The desirability of creating nanoporous sized granular starting materials for laundry and cleaning applications, such as in detergent compositions has been recognized by the inventors of this invention and it has been their focus to develop a process and product that results in granular materials that dissolve easily, are high active agglomerates and that have high liquid loading capability. It has been recognized that in the non-detergent applications, these nanoporous sized granules, which are less volatile than particles of powder, exhibit an appreciably reduced risk of atmospheric pollution and consequently of poisoning by inhalation via the respiratory tract, in the case of toxic starting materials. Further, when the starting material is provided in the form of granules having a regular shape, an even surface and a graded size, it can easily be handled, especially owing to ease of flow, and in particular it is easy to carry out the precise automatic weighing thereof for packaging purposes as well as dosing during subsequent uses. The present invention overcomes the problems, as set forth above.

BACKGROUND ART

Lyophilization is a known technique for obtaining anhydrous products which comprises the desiccation, by sublimation, of a product which has been solidified beforehand by freezing. This lyophilization is used for the manufacture of pharmaceutical, cosmetic, food or veterinary products in pulverulent form.

Published Japanese Patent Application JP 87 305 829 describes the preparation of a chitosan powder by dissolving chitosan in an acid, suspending, freezing and lyophilizing in order to obtain chitosan granules. Such a process does not make it possible to obtain granules with an even surface and with a homogeneous size, and in the nanoporous pore size range.

Published Japanese Patent Application JP 81 152 449 describes a process for the production of a fine powder which consists in dissolving a vehicle substance in an alcoholic solvent, in spraying the solution in an atmosphere at a temperature of less than −40 degrees C. in order to obtain frozen granulated fines and in drying the granules under vacuum while retaining them in the frozen state. Owing to the fact that the granules are formed by spraying by means of a propellant gas, the flow obtained is in the form of a more or less continuous thin stream and it is not possible to obtain frozen granules of homogeneous size, nor are they nanoporous.

U.S. Pat. No. 5,611,973 issued to Gurfein et al. on Mar. 18, 1997 discloses a process for producing a starting material, and in particular colouring materials, in the form of anhydrous granules having a regular shape, an even surface and a graded size. This process provides granules having sufficient cohesion for their subsequent uses and provides granules having a microporous structure which facilitates subsequent dissolution of the product. However, this patent does not provide a process for producing nanoporous size granular starting materials that have markedly improved solubility, activity, liquid loading capability and particularly, nanoporous granular materials for detergent applications.

SUMMARY OF THE INVENTION

The invention meets the needs above by providing a process for producing a starting material in a granular form and in a nanoporous anhydrous state, a process for improving the water-solubility and controlled release characteristics of a detergent material, and a detergent composition.

In one aspect of the present invention, a process for producing a starting material in a granular form and in a nanoporous anhydrous state is disclosed. The process includes the steps of obtaining a starting material in a form of a dispersion or solution in a sublimable solvent or mixtures of sublimable solvents, forming graded droplets by atomization, freezing the graded droplets in a freezing medium at a controlled freezing rate of at least 100° C. per second to form frozen droplets and drying the frozen droplets by vacuum sublimation to obtain freeze-dried granules of the starting material in a nanoporous anhydrous state. The starting material in dispersion or solution form has a viscosity suitable for atomization and formation of graded droplets.

In another aspect of the present invention, a process for improving water-solubility and controlled release characteristics of a detergent material is disclosed. The process includes the steps of obtaining a detergent starting material in a form of a dispersion or solution in a sublimable solvent or mixtures of sublimable solvents, forming graded detergent droplets by atomization, freezing the graded detergent droplets in a freezing medium at a controlled freezing rate of at least 100° C. per second to form frozen detergent droplets, and drying the frozen droplets by vacuum sublimation to obtain freeze-dried detergent granules of the detergent starting material in a nanoporous anhydrous state. The detergent starting material in dispersion or solution form has a viscosity suitable for atomization and formation of graded droplets.

In yet another aspect of the present invention, a detergent composition comprising freeze-dried detergent granules in a nanoporous anhydrous state having uniformly sized pores having a pore size less than about 300 nanometers is disclosed.

These and other objects, features and attendant advantages of the present invention will become apparent to those skilled in the art from a reading of the following detailed description of the preferred embodiment and the appended claims.

DETAILED DESCRIPTION OF THE INVENTION

In the preferred embodiment of the present invention, the process for producing a starting material in a granular form and in a nanoporous anhydrous state includes the step of obtaining a starting material in a form of a dispersion or solution in a sublimable solvent or mixtures of sublimable solvents. The starting material can be provided directly in the form of a solution or of a dispersion in a suitable solvent or mixture of solvents, the viscosity of which can optionally be adjusted by the addition of a chemical agent or by the variation in a physical parameter, such as the temperature or the concentration of solid material. If the starting material is provided in the form of an anhydrous powder, it is then necessary to prepare a solution or dispersion of this powder in a suitable solvent or mixture of solvents.

The solutions or dispersions of the starting material used in the process according to the invention are obtained simply by dissolving or dispersing the powder in a solvent or mixture of solvents suitable for lyophilization. Suitable solvents for lyophilization include water, isopentane, dimethyl sulphoxide, methylamine, ethylamine, diethylamine, propylamine, fumaric acid, acetic acid, t-butyl alcohol, t-amyl alcohol, 1,4-dioxane, isobutane, ethylene oxide and cyclohexane. Water is the preferred sublimable solvent.

The solutions and dispersions used in the process of the invention must have a viscosity such that they can be formed into graded droplets by atomization. The atomization can be accomplished by ultrasonic, acoustic, electrostatic means, pressure swirl nozzles or two-fluid nozzles, the preferred mode being ultrasonic atomization.

Consequently, the starting material in the form of dispersion or solution has a viscosity desirably in a range of from about 1 cP to about 250 cP at a solution temperature in a range of from about 60° C. to about 91° C. and at a shear rate in a range of from about 1000 $\sec^{-1}$ to about 10000 $\sec^{-1}$, preferably in a range of from about 25 cP to about 125 cP and more preferably in a range of from about 50 cP to about 100 cP. The term "solution temperature" means the temperature of the solution or dispersion of the starting material.

In the preferred embodiment, a structuring agent is added to the starting material in dispersion or solution to affect crystal growth formation in the graded droplets during the step of freezing. Mention may be made, among the structuring agents which can be used in the solutions or dispersions according to the invention, of mannitol, glucose, lactose, maltose, polyethylene glycol, starch, polyvinylpyrrolidone, inorganic salts, sorbitol and CARBOPOL™ brand carboxyvinyl polymer (Goodrich Chemical Co.). The choice of the structuring aid will very clearly depend on the subsequent use envisaged for the granules. The amount of additives can be easily determined by a person skilled in the art and depends on the additive.

In the preferred embodiment of the present invention, the starting material in dispersion or solution form has a viscosity suitable for atomization and formation of graded droplets. It is sometimes necessary to add one or a number of additives in order to obtain the aforementioned viscosity which makes it possible mechanically to form graded droplets by atomization and/or to confer a certain cohesion or degree of binding on the resultant granules. These additives are generally chosen from the gelling agents known in lyophilization. Suitable gelling agents which can be used in the solutions or dispersions according to the invention, include carbomers, hydroxyethyl cellulose, carboxymethyl cellulose, agar, xanthan gum, starch, polyethylene glycol, polyvinylpyrrolidone, locust bean gum, guar gum, gelatin, casein, pectin, alginates and carrageenates. It is also possible to adjust the viscosity of the solution or of the dispersion by adjusting the temperature of the solution or of the dispersion during the atomization step or even by adjusting the percentage of solids in the solution or in the dispersion.

In the preferred embodiment of the present invention, the process for producing a starting material in a granular form and in a nanoporous anhydrous state includes the step of forming graded droplets by atomization. A significant aspect of the process of the present invention relates to the formation of drops of graded size from the solution or dispersion of the starting material. This stage is a mechanical shaping stage which, in contrast to other techniques such as spraying or manifold of pipes or needles for droplet formation, makes it possible to obtain drops with a well-defined generally spherical or semi-spherical, shape, an even surface and a finely graded size. By using atomization techniques, such as by ultrasonic, acoustic, electrostatic, pressure swirl nozzle or two-fluid nozzle means, the preferred mode being ultrasonic atomization, it is possible to form graded droplets which have a uniform shape and size. Desirably, the graded droplets have a uniform spherical shape and a size in a range from about 10 $\mu$m to about 700 $\mu$m, and preferably they have a uniform spherical shape and a size in a range from about 20 $\mu$m to about 100 $\mu$m. The drops formed can comprise starting materials of different chemical natures and thus form a starting material in the form of granules having the characteristics of each of the starting materials.

In the preferred embodiment of the present invention, the process for producing a starting material in a granular form and in a nanoporous anhydrous state includes the step of freezing the graded droplets in a freezing medium at a controlled freezing rate of desirably at least 100° C. per second to form frozen droplets. Preferably, the controlled freezing rate is at least 200° C. per second, and more preferably, the controlled freezing rate is at least 400° C. per second. The inventors have discovered that this step is the most critical step to achieving nanoporous sized granular starting materials, i.e., the carefully controlled and preselected rate of cooling. Without being bound to any specific theory, it is believed that at cooling rates of at least 100° C. per second, the water which usually forms ice-crystals at low freezing rates, such as rates less than about 100° C. per second, now either forms very small crystals, or becomes frozen in its glassy state. As a result of this first phenomenon, when water is sublimed from the frozen matrix in a vacuum oven, a highly porous matrix is left behind with pores of a size similar to those of the frozen water pockets that are formed during the freezing process. These pores are not only small and nanometer sized, but also have a very homogeneous size distribution. In the preferred embodiment of the present invention, the freeze-dried granules in a nanoporous anhydrous state have uniformly sized pores having a pore size less than about 300 nanometers.

Without being bound to any specific theory, it is believed by the inventors that any salts that are soluble in water and that crystallize out of the solution during freezing, form either micron or submicron, and more particularly, nanometer sized crystals during the fast rates of freezing, such as rates of at least 100° C. per second. As a result of this second phenomenon, when the water is sublimed from the frozen matrix, a nanometer sized crystalline agglomerate having a size substantially equal to the original droplet size is formed. The inventors believe that it these two phenomena that lead to a highly porous matrix with nanometer sized pores within and on the agglomerate surface.

In the preferred embodiment of the present invention, the process for producing a starting material in a granular form and in a nanoporous anhydrous state includes the step of drying the frozen droplets by vacuum sublimation to obtain freeze-dried granules of the starting material in a nanoporous anhydrous state.

In another embodiment of the present invention, a process for improving water-solubility and controlled release characteristics of a detergent material includes the steps of obtaining a detergent starting material in a form of a dispersion or solution in a sublimable solvent or mixtures of sublimable solvents, forming graded detergent droplets by atomization, freezing the graded detergent droplets in a freezing medium at a controlled freezing rate of at least 100° C. per second to form frozen detergent droplets, and drying the frozen droplets by vacuum sublimation to obtain freeze-dried detergent granules of the detergent starting material in a nanoporous anhydrous state. The detergent starting material in dispersion or solution form has a viscosity suitable for atomization and formation of graded droplets. Desirably, the detergent starting material in the form of dispersion or solution has a viscosity in a range of from about 50 cP to about 125 cP at a solution temperature in a range of from about 60° C. to about 91° C. and at a shear rate in a range of from about 1000 sec$^{-1}$ to about 10000 sec$^{-1}$. Desirably, the graded detergent droplets have a uniform spherical shape and a size in a range from about 20 $\mu$m to about 50 $\mu$m and formed by atomization, preferably, by ultrasonic atomization means. In this embodiment, the controlled freezing rate is at least 200° C. per second and the freeze-dried detergent granules in a nanoporous anhydrous state have uniformly sized pores having a pore size less than about 300 nanometers.

In another preferred embodiment of the present invention, a detergent composition comprising freeze-dried detergent granules in a nanoporous anhydrous state having uniformly sized pores having a pore size less than about 300 nanometers is disclosed.

Detergent Components

The detergent composition may include surfactant systems such as anionic, nonionic, zwitterionic, ampholytic and cationic surfactant classes and compatible mixtures thereof. Detergent surfactants are described in U.S. Pat. No. 3,664,961, Norris, issued May 23, 1972, and in U.S. Pat. No. 3,919,678, Laughlin et al., issued Dec. 30, 1975, both of which are incorporated herein by reference. Cationic surfactants include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference.

Nonlimiting examples of surfactant systems include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3)alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("AE$_x$S"; especially EO 1-7 ethoxy sulfates), $C_{10}$–$C_{18}$ alkyl alkoxy carboxylates (especially the EO 1-5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the surfactant system. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

The detergent composition can, and preferably does, include a detergent builder. Builders are generally selected from the various water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates. Preferred are the alkali metal, especially sodium, salts of the above. Preferred for use herein are the phosphates, carbonates, silicates, $C_{10\text{-}18}$ fatty acids, polycarboxylates, and mixtures thereof. More preferred are sodium tripolyphosphate, tetrasodium pyrophosphate, citrate, tartrate mono- and di-succinates, sodium silicate, and mixtures thereof (see below).

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, all of which are incorporated herein by reference.

Examples of nonphosphorus, inorganic builders are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967, the disclosure of which is incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid. Some of these materials are useful as the water-soluble anionic polymer as hereinafter described, but only if in intimate admixture with the nonsoap anionic surfactant.

Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition. Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Water-soluble silicate solids represented by the formula $SiO_2.M_2O$, M being an alkali metal, and having a $SiO_2:M_2O$ weight ratio of from about 0.5 to about 4.0, are useful salts in the detergent granules of the invention at levels of from about 2% to about 15% on an anhydrous weight basis, preferably from about 3% to about 8%. Anhydrous or hydrated particulate silicate can be utilized, as well.

Any number of additional ingredients can also be included as components in the granular detergent composition. These include other detergency builders, bleaches, bleach activators, suds boosters or suds suppressors, anti-tarnish and anti-corrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference.

Bleaching agents and activators are described in U.S. Pat. No. 4,412,934, Chung et al., issued Nov. 1, 1983, and in U.S. Pat. No. 4,483,781, Hartman, issued Nov. 20, 1984, both of which are incorporated herein by reference. Chelating agents are also described in U.S. Pat. No. 4,663,071, Bush et al., from Column 17, line 54 through Column 18, line 68, incorporated herein by reference. Suds modifiers are also optional ingredients and are described in U.S. Pat. No. 3,933,672, issued Jan. 20, 1976 to Bartoletta et al., and U.S. Pat. No. 4,136,045, issued Jan. 23, 1979 to Gault et al., both incorporated herein by reference.

Suitable smectite clays for use herein are described in U.S. Pat. No. 4,762,645, Tucker et al., issued Aug. 9, 1988, Column 6, line 3 through Column 7, line 24, incorporated herein by reference. Suitable additional detergency builders for use herein are enumerated in the Baskerville patent, Column 13, line 54 through Column 16, line 16, and in U.S. Pat. No. 4,663,071, Bush et al., issued May 5, 1987, both incorporated herein by reference.

The following examples are presented for illustrative purposes only and are not to be construed as limiting the scope of the appended claims in any way.

ABBREVIATIONS USED IN EXAMPLES

In the detergent compositions, the abbreviated component identifications have the following meanings:

LAS: Sodium linear C11–13 alkyl benzene sulfonate
TAS: Sodium tallow alkyl sulfate
CxyAS: Sodium C1x–C1y alkyl sulfate
C46SAS: Sodium C14–C16 secondary (2,3)alkyl sulfate
CxyEzS: Sodium C1x–C1y alkyl sulfate condensed with z moles of ethylene oxide
CxyEz: C1x–C1y predominantly linear primary alcohol condensed with an average of z moles of ethylene oxide
QAS: R2.N+(CH3)2(C2H4OH) with R2=C12–C14
QAS 1: R2.N+(CH3)2(C2H4OH) with R2=C8–C11
APA: C8–C10 amido propyl dimethyl amine
Soap: Sodium linear alkyl carboxylate derived from an 80/20 mixture of tallow and coconut fatty acids
STS: Sodium toluene sulphonate
CFAA: C12–C14 (coco)alkyl N-methyl glucamide
TFAA: C16–C18 alkyl N-methyl glucamide
TPKFA: C12–C14 topped whole cut fatty acids
STPP: Anhydrous sodium tripolyphosphate
TSPP: Tetrasodium pyrophosphate
Zeolite A: Hydrated sodium aluminosilicate of formula Na12(AlO2SiO2)12.27H2O having a primary particle size in the range from 0.1 to 10 micrometers (weight expressed on an anhydrous basis)
NaSKS-6: Crystalline layered silicate of formula d-Na2Si2O5
Citric acid: Anhydrous citric acid
Borate: Sodium borate
Carbonate: Anydrous sodium carbonate with a particle size between 200 μm and 900 μm
Bicarbonate: Anhydrous sodium bicarbonate with a particle size distribution between 400 μm and 1200 μm
Silicate: Amorphous sodium silicate (SiO2:Na2O=2.0:1)
Sulfate: Anhydrous sodium sulfate
Mg sulfate: Anhydrous magnesium sulfate
Citrate: Tri-sodium citrate dihydrate of activity 86.4% with a particle size distribution between 425 μm and 850 μm
MA/AA: Copolymer of 1:4 maleic/acrylic acid, average molecular weight about 70,000
MA/AA (1): Copolymer of 4:6 maleic/acrylic acid, average molecular weight about 10,000
AA: Sodium polyacrylate polymer of average molecular weight 4,500
CMC: Sodium carboxymethyl cellulose
Cellulose ether: Methyl cellulose ether with a degree of polymerization of 650 available from Shin Etsu Chemicals
Protease: Proteolytic enzyme, having 3.3% by weight of active enzyme, sold by NOVO Industries A/S under the tradename Savinase
Protease I: Proteolytic enzyme, having 4% by weight of active enzyme, as described in WO 95/10591, sold by Genencor Int. Inc.
Alcalase: Proteolytic enzyme, having 5.3% by weight of active enzyme, sold by NOVO Industries A/S
Cellulase: Cellulytic enzyme, having 0.23% by weight of active enzyme, sold by NOVO Industries A/S under the tradename Carezyme
Amylase: Amylolytic enzyme, having 1.6% by weight of active enzyme, sold by NOVO Industries A/S under the tradename Termamyl 120T
Lipase: Lipolytic enzyme, having 2.0% by weight of active enzyme, sold by NOVO Industries A/S under the tradename Lipolase
Lipase (1): Lipolytic enzyme, having 2.0% by weight of active enzyme, sold by NOVO Industries A/S under the tradename Lipolase Ultra
Endolase: Endoglucanase enzyme, having 1.5% by weight of active enzyme, sold by NOVO Industries A/S
PB4: Sodium perborate tetrahydrate of nominal formula NaBO2.3H2O.H2O2—
PB1: Anhydrous sodium perborate bleach of nominal formula NaBO2.H2O2
Percarbonate: Sodium percarbonate of nominal formula 2Na2CO3.3H2O2
NOBS: Nonanoyloxybenzene sulfonate in the form of the sodium salt
NAC-OBS: (6-nonamidocaproyl)oxybenzene sulfonate
TAED: Tetraacetylethylenediamine
DTPA: Diethylene triamine pentaacetic acid
DTPMP: Diethylene triamine penta(methylene phosphonate), marketed by Monsanto under the Tradename Dequest 2060
EDDS: Ethylenediamine-N,N'-disuccinic acid, (S,S) isomer in the form of its sodium salt.
Photoactivated: Sulfonated zinc phthlocyanine encapsulated in bleach (1) dextrin soluble polymer
Photoactivated: Sulfonated alumino phthlocyanine encapsulated in bleach (2) dextrin soluble polymer
Brightener 1: Disodium 4,4'-bis(2-sulphostyryl)biphenyl
Brightener 2: Disodium 4,4'-bis(4-anilino-6-morpholino-1,3,5-triazin-2-yl)amino) stilbene-2:2'-disulfonate
HEDP: 1,1-hydroxyethane diphosphonic acid
PEGx: Polyethylene glycol, with a molecular weight of x (typically 4,000)
PEO: Polyethylene oxide, with an average molecular weight of 50,000
TEPAE: Tetraethylenepentaamine ethoxylate
PVI: Polyvinyl imidosole, with an average molecular weight of 20,000
PVP: Polyvinylpyrolidone polymer, with an average molecular weight of 60,000
PVNO: Polyvinylpyridine N-oxide polymer, with an average molecular weight of 50,000
PVPVI: Copolymer of polyvinylpyrolidone and vinylimidazole, with an average molecular weight of 20,000
QEA: bis((C2H5O)(C2H4O)n)(CH3)—N+—C6H12—N+—(CH3) bis((C2H5O)—(C2H4O))n, wherein n=from 20 to 30
SRP 1: Anionically end capped poly esters
SRP 2: Diethoxylated poly(1,2 propylene terephtalate) short block polymer
PEI: Polyethyleneimine with an average molecular weight of 1800 and an average ethoxylation degree of 7 ethyleneoxy residues per nitrogen
Silicone antifoam: Polydimethylsiloxane foam controller with siloxane-oxyalkylene copolymer as dispersing agent with a ratio of said foam controller to said dispersing agent of 10:1 to 100:1
Opacifier: Water based monostyrene latex mixture, sold by BASF Aktiengesellschaft under the tradename Lytron 621
Wax: Paraffin wax In the following examples all levels are quoted as % by weight of the composition:

EXAMPLE I

The following compositions are in accordance with the invention.

|  | A | B | C | D | E | F | G | H | I |
|---|---|---|---|---|---|---|---|---|---|
| Spray-dried Granules | | | | | | | | | |
| LAS | 10.0 | 10.0 | 15.0 | 5.0 | 5.0 | 10.0 | — | — | — |
| TAS | — | 1.0 | — | — | — | — | — | — | — |
| MBAS | — | — | — | 5.0 | 5.0 | — | — | — | — |
| $C_{45}AS$ | — | — | 1.0 | — | 2.0 | 2.0 | — | — | — |
| $C_{45}AE_3S$ | — | — | — | 1.0 | — | — | — | — | — |
| QAS | — | — | 1.0 | 1.0 | — | — | — | — | — |
| DTPA, HEDP and/or EDDS | 0.3 | 0.3 | 0.5 | 0.3 | — | — | — | — | — |
| MgSO4 | 0.5 | 0.5 | 0.1 | — | — | — | — | — | — |
| Sodium citrate | — | — | — | 3.0 | 5.0 | — | — | — | — |
| Sodium carbonate | 10.0 | 7.0 | 15.0 | — | — | 10.0 | — | — | — |
| Sodium sulphate | 5.0 | 5.0 | — | — | 5.0 | 3.0 | — | — | — |
| Sodium silicate 1.6R | — | — | — | — | 2.0 | — | — | — | — |
| Zeolite A | 16.0 | 18.0 | 20.0 | 20.0 | — | — | — | — | — |
| SKS-6 | — | — | — | 3.0 | 5.0 | — | — | — | — |
| MA/AA or AA | 1.0 | 2.0 | 11.0 | — | — | 2.0 | — | — | — |
| PEG 4000 | — | 2.0 | — | 1.0 | — | 1.0 | — | — | — |
| QEA | 1.0 | — | — | — | 1.0 | — | — | — | — |
| Brightener | 0.05 | 0.05 | 0.05 | — | 0.05 | — | — | — | — |
| Silicone oil | 0.01 | 0.01 | 0.01 | — | — | 0.01 | — | — | — |
| Agglomerate | | | | | | | | | |
| LAS | | | | — | — | — | — | 2.0 | 2.0 | — |
| MBAS | | | | — | — | — | — | — | — | 1.0 |
| $C_{45}AS$ | | | | — | — | — | — | 2.0 | — | — |
| $AE_3$ | | | | — | — | — | — | — | 1.0 | 0.5 |
| Carbonate | | | | — | — | 4.0 | 1.0 | 1.0 | 1.0 | — |
| Sodium citrate | | | | — | — | — | — | — | — | 5.0 |
| CFAA | | | | — | — | — | — | — | — | — |
| Citric acid | | | | — | — | — | 4.0 | — | 1.0 | 1.0 |
| QEA | | | | — | — | — | 2.0 | 2.0 | 1.0 | — |
| SRP | | | | — | — | — | 1.0 | 1.0 | 0.2 | — |
| Zeolite A | | | | — | — | — | 15.0 | 26.0 | 15.0 | 16.0 |
| Sodium silicate | | | | — | — | — | — | — | — | — |
| PEG | — | — | — | — | — | — | 4.0 | — | — |
| Builder Agglomerates | | | | | | | | | |
| SKS-6 | 6.0 | — | — | — | 6.0 | 3.0 | — | 7.0 | 10.0 |
| LAS | 4.0 | 5.0 | — | — | 5.0 | 3.0 | — | 10.0 | 12.0 |
| Dry-add particulate components | | | | | | | | | |
| Maleic acid/carbonate/bicarbonate (40:20:40) | 8.0 | 10.0 | 10.0 | 4.0 | — | 8.0 | 2.0 | 2.0 | 4.0 |
| QEA | — | — | — | 0.2 | 0.5 | — | — | — | — |
| NACAOBS | 3.0 | — | — | 1.5 | — | — | — | 2.5 | — |
| NOBS | — | 3.0 | 3.0 | — | — | — | — | — | 5.0 |
| TAED | 2.5 | — | — | 1.5 | 2.5 | 6.5 | — | 1.5 | — |
| MBAS | — | — | — | 8.0 | — | — | 8.0 | — | 4.0 |
| LAS (flake) | 10.0 | 10.0 | — | — | — | — | — | 8.0 | — |
| Spray-on | | | | | | | | | |
| Brightener | 0.2 | 0.2 | 0.3 | 0.1 | 0.2 | 0.1 | — | 0.6 | — |
| Dye | — | — | — | 0.3 | 0.05 | 0.1 | — | — | — |
| AE7 | — | — | — | — | — | 0.5 | — | 0.7 | — |
| Perfume | — | — | — | 0.8 | — | 0.5 | — | 0.5 | — |
| Dry-add | | | | | | | | | |
| Citrate | — | — | 20.0 | 4.0 | — | 5.0 | 15.0 | — | 5.0 |
| Percarbonate | 15.0 | 3.0 | 6.0 | 10.0 | — | — | — | 18.0 | 5.0 |
| Perborate | — | — | — | — | 6.0 | 18.0 | — | — | — |
| Photobleach | 0.02 | 0.02 | 0.02 | 0.1 | 0.05 | — | 0.3 | — | 0.03 |
| Enzymes (cellulase, amylase, protease, lipase) | 1.3 | 0.3 | 0.5 | 0.5 | 0.8 | 2.0 | 0.5 | 0.16 | 0.2 |
| Carbonate | 0.0 | 10.0 | — | — | — | 5.0 | 8.0 | 10.0 | 5.0 |
| Perfume (encapsulated) | 0.6 | 0.5 | 0.5 | — | 0.3 | 0.5 | 0.2 | 0.1 | 0.6 |
| Suds suppressor | 1.0 | 0.6 | 0.3 | — | 0.10 | 0.5 | 1.0 | 0.3 | 1.2 |
| Soap | 0.5 | 0.2 | 0.3 | 3.0 | 0.5 | — | — | 0.3 | — |

-continued

|  | A | B | C | D | E | F | G | H | I |
|---|---|---|---|---|---|---|---|---|---|
| Citric acid | — | — | — | 6.0 | 6.0 | — | — | — | 5.0 |
| Dyed carbonate (blue, green) | 0.5 | 0.5 | 1.0 | 2.0 | — | 0.5 | 0.5 | 0.5 | 1.0 |
| SKS-6 | — | — | — | 4.0 | — | — | — | 6.0 | — |
| Fillers up to 100% | | | | | | | | | |

EXAMPLE II

The following compositions are in accordance with the invention.

|  | A | B | C | D | E | F | G | H | I |
|---|---|---|---|---|---|---|---|---|---|
| Spray-dried Granules | | | | | | | | | |
| LAS | 10.0 | 10.0 | 16.0 | 5.0 | 5.0 | 10.0 | — | — | — |
| TAS | — | 1.0 | — | — | — | — | — | — | — |
| MBAS | — | — | — | 5.0 | 5.0 | — | — | — | — |
| $C_{45}AS$ | — | — | 1.0 | — | 2.0 | 2.0 | — | — | — |
| $C_{45}AE_3S$ | — | — | — | 1.0 | — | — | — | — | — |
| QAS | — | — | 1.0 | 1.0 | — | — | — | — | — |
| DTPA, HEDP and/or EDDS | 0.3 | 0.3 | 0.3 | 0.3 | — | — | — | — | — |
| MgSO4 | 0.5 | 0.4 | 0.1 | — | — | — | — | — | — |
| Sodium citrate | 10.0 | 12.0 | 17.0 | 3.0 | 5.0 | — | — | — | — |
| Sodium carbonate | 15.0 | 8.0 | 15.0 | — | — | 10.0 | — | — | — |
| Sodium sulphate | 5.0 | 5.0 | — | — | 5.0 | 3.0 | — | — | — |
| Sodium silicate 1.6R | — | — | — | — | 2.0 | — | — | — | — |
| Zeolite A | — | — | — | 2.0 | — | — | — | — | — |
| SKS-6 | — | — | — | 3.0 | 5.0 | — | — | — | — |
| MA/AA or AA | 1.0 | 2.0 | 10.0 | — | — | 2.0 | — | — | — |
| PEG 4000 | — | 2.0 | — | 1.0 | — | 1.0 | — | — | — |
| QEA | 1.0 | — | — | 1.0 | — | — | — | — | — |
| Brightener | 0.05 | 0.05 | 0.05 | — | 0.05 | — | — | — | — |
| Silicone oil | 0.01 | 0.01 | 0.01 | — | — | 0.01 | — | — | — |
| Agglomerate | | | | | | | | | |
| LAS | — | — | — | — | — | — | 2.0 | 2.0 | — |
| MBAS | — | — | — | — | — | — | — | — | 1.0 |
| $C_{45}AS$ | — | — | — | — | — | — | 2.0 | — | — |
| $AE_3$ | — | — | — | — | — | — | — | 1.0 | 0.5 |
| Carbonate | — | — | — | — | 4.0 | 1.0 | 1.0 | 1.0 | — |
| Sodium citrate | — | — | — | — | — | — | — | — | 5.0 |
| CFAA | — | — | — | — | — | — | — | — | — |
| Citric acid | — | — | — | — | — | 4.0 | — | 1.0 | 1.0 |
| QEA | — | — | — | — | — | 2.0 | 2.0 | 1.0 | — |
| SRP | — | — | — | — | — | 1.0 | 1.0 | 0.2 | — |
| Zeolite A | — | — | — | — | — | 15.0 | 26.0 | 15.0 | 16.0 |
| Sodium silicate | — | — | — | — | — | — | — | — | — |
| PEG | — | — | — | — | — | — | 4.0 | — | — |
| Builder Agglomerates | | | | | | | | | |
| SKS-6 | 6.0 | 5.0 | — | — | 6.0 | 3.0 | — | 7.0 | 10.0 |
| LAS | 4.0 | 5.0 | — | — | 5.0 | 3.0 | — | 10.0 | 12.0 |
| Dry-add particulate components | | | | | | | | | |
| Maleic acid/carbonate/bicarbonate (40:20:40) | 8.0 | 10.0 | 4.0 | 4.0 | — | 8.0 | 2.0 | 2.0 | 4.0 |
| QEA | — | — | — | 0.2 | 0.5 | — | — | — | — |
| NACAOBS | 3.0 | — | — | 1.5 | — | — | — | 2.5 | — |
| NOBS | — | 3.0 | 3.0 | — | — | — | — | — | 5.0 |
| TAED | 2.5 | — | — | 1.5 | 2.5 | 6.5 | — | 1.5 | — |
| MBAS | — | — | — | 8.0 | — | — | 8.0 | — | 4.0 |
| LAS (flake) | — | — | — | — | — | — | — | 8.0 | — |
| Spray-on | | | | | | | | | |
| Brightener | 0.2 | 0.2 | 0.3 | 0.1 | 0.2 | 0.1 | — | 0.6 | — |
| Dye | — | — | — | 0.3 | 0.05 | 0.1 | — | — | — |
| AE7 | — | — | — | — | — | 0.5 | — | 0.7 | — |
| Perfume | — | — | — | 0.8 | — | 0.5 | — | 0.5 | — |
| Dry-add | | | | | | | | | |
| Citrate | 4.0 | — | 3.0 | 4.0 | — | 5.0 | 15.0 | — | 5.0 |

-continued

|  | A | B | C | D | E | F | G | H | I |
|---|---|---|---|---|---|---|---|---|---|
| Percarbonate | 15.0 | 3.0 | 6.0 | 10.0 | — | — | — | 18.0 | 5.0 |
| Perborate | — | — | — | — | 6.0 | 18.0 | — | — | — |
| Photobleach | 0.02 | 0.02 | 0.02 | 0.1 | 0.05 | — | 0.3 | — | 0.03 |
| Enzymes (cellulase, amylase, protease, lipase) | 1.5 | 0.3 | 0.5 | 0.5 | 0.8 | 2.0 | 0.5 | 0.16 | 0.2 |
| Carbonate | — | — | — | — | — | 5.0 | 8.0 | 10.0 | 5.0 |
| Perfume (encapsulated) | 0.6 | 0.5 | 0.5 | — | 0.3 | 0.5 | 0.2 | 0.1 | 0.6 |
| Suds suppressor | 1.0 | 0.6 | 0.3 | — | 0.10 | 0.5 | 1.0 | 0.3 | 1.2 |
| Soap | 0.5 | 0.2 | 0.3 | 3.0 | 0.5 | — | — | 0.3 | — |
| Citric acid | — | — | — | 6.0 | 6.0 | — | — | — | 5.0 |
| Dyed carbonate (blue, green) | 0.5 | 0.5 | ? | 2.0 | — | 0.5 | 0.5 | 0.5 | 1.0 |
| SKS-6 | — | — | — | 4.0 | — | — | — | 6.0 | — |
| Fillers up to 100% |  |  |  |  |  |  |  |  |  |

The following Examples illustrate the benefits of a nanoporous particulate starting material for making, amongst other products, detergents.

EXAMPLE III

An aqueous solution having the formula set forth in Table A below was heated to a temperature of about 91° C. The solution was then sprayed through an ultrasonic atomizer (Sono-Tek®) at a flow rate of 75.3 g/min for 12 sec at 2.5 watts into a sample tray holding liquid nitrogen. The frozen liquid droplets were then lyophilized in a vacuum chamber (commercially available from APS Inc., Model D) under a pressure of 200 mTorr for two hours.

TABLE A

| Component | % by Weight |
|---|---|
| MgSO4 | 27.8 |
| Micronised Carbonate | 32.7 |
| Distilled Water | 49.5 |

The granules obtained have a spherical shape, a surface area of about 25 m$^2$/gm and a porosity of about 28% and exhibit excellent liquid holding characteristics.

EXAMPLE IV

An aqueous solution having the formula set forth in Table B below was heated up to a temperature of about 60° C. The solution was then sprayed through an ultrasonic atomizer (Sono-Tek®) at a flow rate of 46 g/min for 10 sec at 5.0 watts into a sample tray holding liquid nitrogen. The frozen liquid droplets were then lyophilized in a vacuum chamber (commercially available from APS inc., Model D) under a pressure of 200 mTorr for two hours.

TABLE B

| Component | % by Weight |
|---|---|
| Aluminosilicate | 17.5 |
| Sodium Sulfate | 4.4 |
| Acrylic Acid/Maleic Acid Co-polymer | 2.9 |
| C12–13 linear alkylbenzene sulfonate, Na | 5.9 |
| Sodium silicate | 2.2 |
| Carboxymethylcellulose | 0.8 |
| Brightener 47 | 0.2 |
| Silicone antifoam | 0.7 |
| DTPMPA[1] | 0.4 |
| Water | 65.0 |

[1]Diethylene Triamine Pentamethylenephosphonic Acid

The granules obtained have a spherical shape, a surface area of about 25 m$^2$/gm, a porosity of about 30% and exhibit excellent solubility characteristics.

EXAMPLE V

An aqueous solution having 25% by weight of NaCl was heated up to a temperature of about 68° C. The solution was then sprayed through an ultrasonic atomizer (Sono-Tek®) at a flow rate of 66.4 g/min for 10 sec at 2.5 watts into a sample tray holding liquid nitrogen. The frozen liquid droplets were then lyophilized in a vacuum chamber (commercially available from APS Inc., Model D) under a pressure of 200 mTorr for two hours.

The granules obtained had a spherical shape, a surface area of about 22 m$^2$/gm and a porosity of about 35% and exhibit excellent solubility characteristics.

Accordingly, having thus described the invention in detail, it will be obvious to those skilled in the art that various changes may be made without departing from the scope of the invention and the invention is not to be considered limited to what is described in the specification.

What is claimed is:

1. A process for producing a starting material for a detergent composition, said starting material being in a granular form and in a nanoporous anhydrous state, comprising the steps of:

(a) obtaining a starting material for a detergent composition in a form of a dispersion or solution in a sublimable solvent or mixtures of sublimable solvents, said starting material in dispersion or solution form having a viscosity suitable for atomization and formation of graded droplets;

(b) forming graded droplets by atomization;

(c) freezing said graded droplets in a freezing medium at a controlled freezing rate of at least 100° C. per second to form frozen droplets;

(d) drying said frozen droplets by vacuum sublimation to obtain freeze-dried granules of said starting material in a nanoporous anhydrous state; and (e) loading perfumes on to said granules.

2. The process according to claim 1 wherein said starting material in the form of dispersion or solution has a viscosity in a range of from about 1 cP to about 250 cP at a solution temperature in a range of from about 60° C. to about 91° C. and at a shear rate in a range of from about 1000 sec$^{-1}$ to about 10000 sec$^{-1}$.

3. The process according to claim 2, wherein said starting material in the form of dispersion or solution has a viscosity in a range of from about 25 cP to about 125 cP at a solution temperature in a range of from about 60° C. to about 91° C. and at a shear rate in a range of from about 1000 sec$^{-1}$ to about 10000 sec$^{-1}$.

4. The process according to claim 3, wherein said starting material in the form of dispersion or solution has a viscosity in a range of from about 50 cP to about 100 cP at a solution temperature in a range of from about 60° C. to about 91° C. and at a shear rate in a range of from about 1000 sec$^{-1}$ to about 10000 sec$^{-1}$.

5. The process according to claim 1 wherein a structuring agent is added to said starting material in dispersion or solution to affect crystal growth formation in said graded droplets during the step of freezing.

6. The process according to claim 5 wherein said structuring agent is selected from the group consisting of mannitol, maltose, glucose, lactose, polyethylene glycol, starch, polyvinylpyrrolidone, inorganic salts, sorbitol and carboxyvinyl polymer.

7. The process according to claim 2, wherein said viscosity of said starting material in dispersion or solution form is adjustable by adding a gelling agent therein, or by adjusting the temperature thereof.

8. The process according to claim 7, wherein said gelling agent is selected from the group consisting of carbomers, hydroxyethyl cellulose, carboxymethyl cellulose, agar, xanthan gum, starch, polyethylene glycol, polyvinylpyrrolidone, locust bean gum, guar gum, gelatin, casein, pectin, alginates and carrageenates.

9. The process according to claim 1, wherein said graded droplets have a uniform shape and size.

10. The process according to claim 9 wherein said graded droplets have a uniform spherical shape and a size in a range from about 10 μm to about 700 μm.

11. The process according to claim 10 wherein said graded droplets have a uniform spherical shape and a size in a range from about 20 μm to about 100 μm.

12. The process according to claim 1, wherein said atomization includes atomization by ultrasonic, acoustic, pressure swirl nozzle, two-fluid nozzle, or electrostatic means.

13. The process according to claim 1, wherein said controlled freezing rate is at least 200° C. per second.

14. The process according to claim 1, wherein said controlled freezing rate is at least 400° C. per second.

15. The process according to claim 1 wherein said freeze-dried granules in a nanoporous anhydrous state have uniformly sized pores having a pore size less than about 300 nanometers.

16. A detergent composition, comprising freeze-dried detergent granules prepared according to claim 1 in a nanoporous state having uniformly sized pores having a pore size less than about 300 nanometers.

* * * * *